Figure 1:
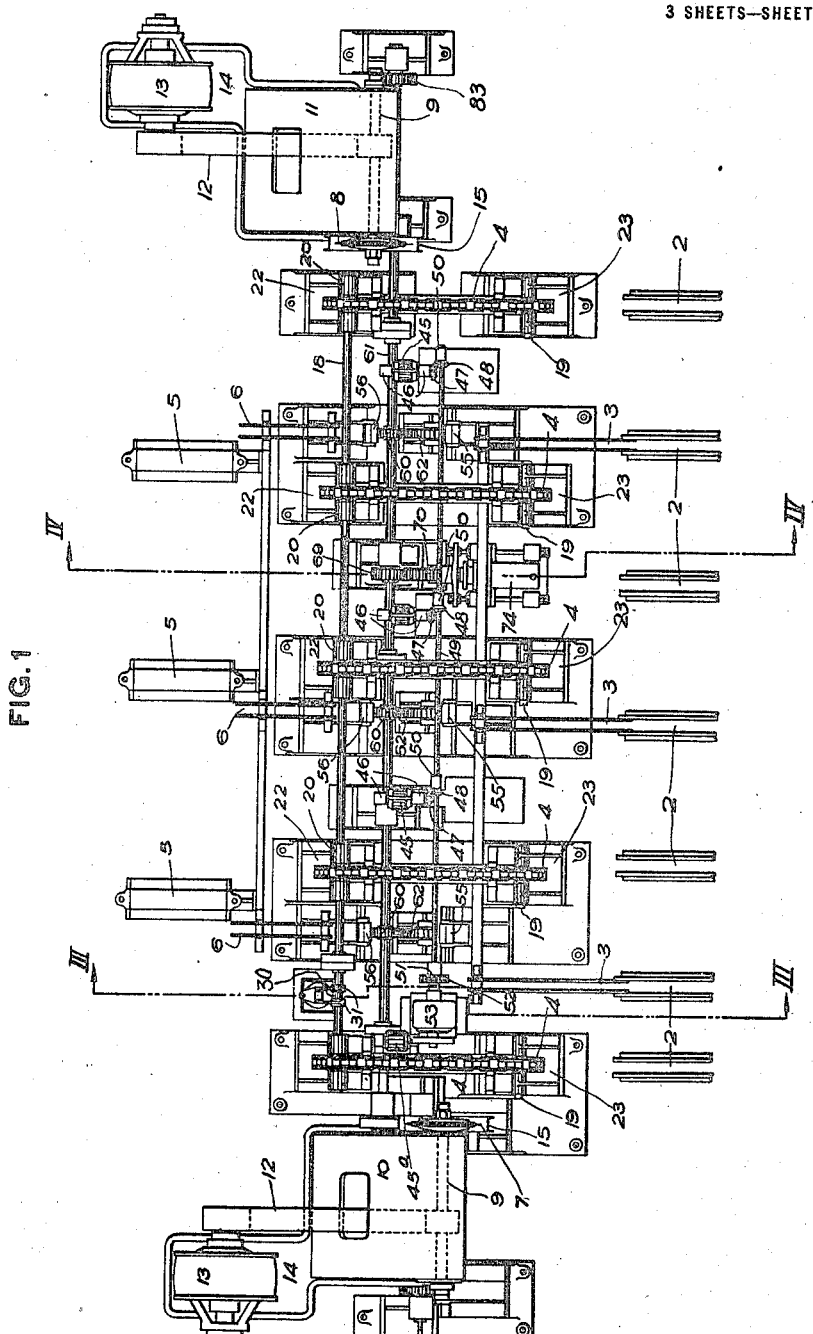

D. HEGGIE.
SAWING MACHINE.
APPLICATION FILED JAN. 21, 1915.

1,155,060.

Patented Sept. 28, 1915.
3 SHEETS—SHEET 1.

WITNESSES

INVENTOR
David Heggie
by
his Attorney

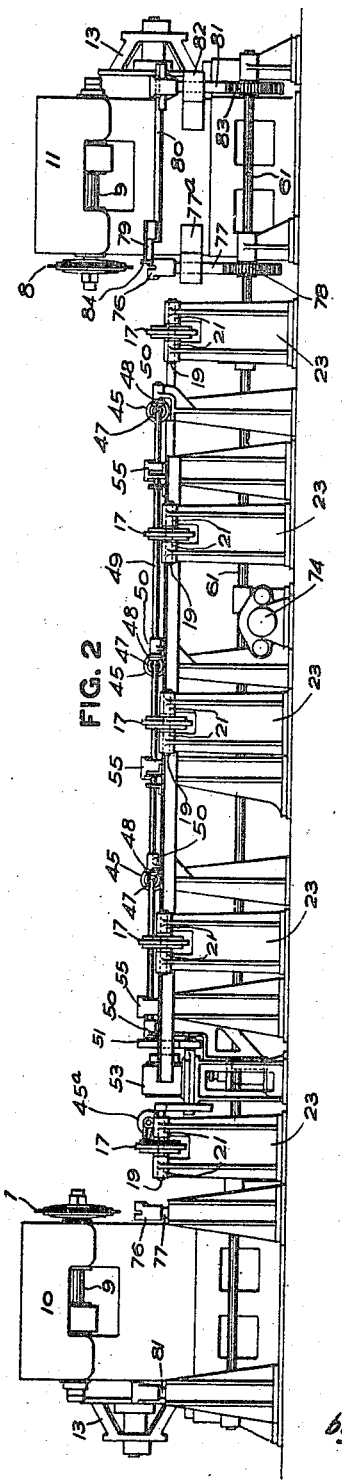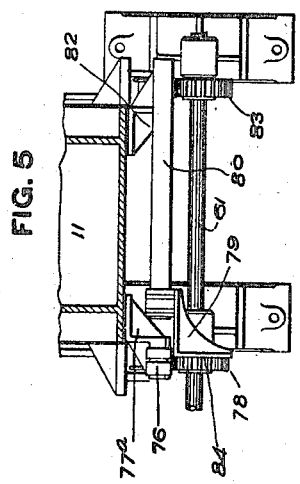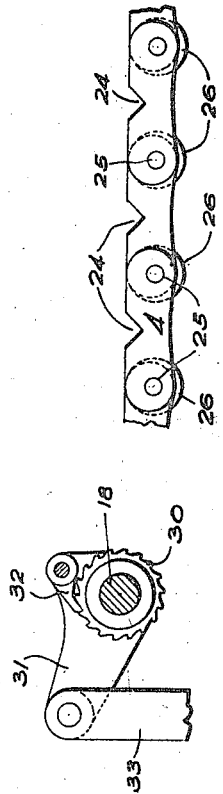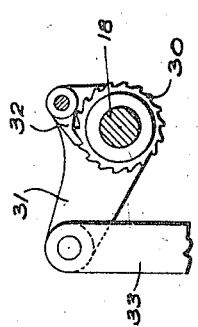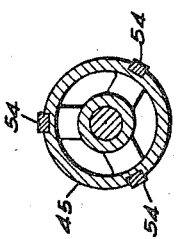

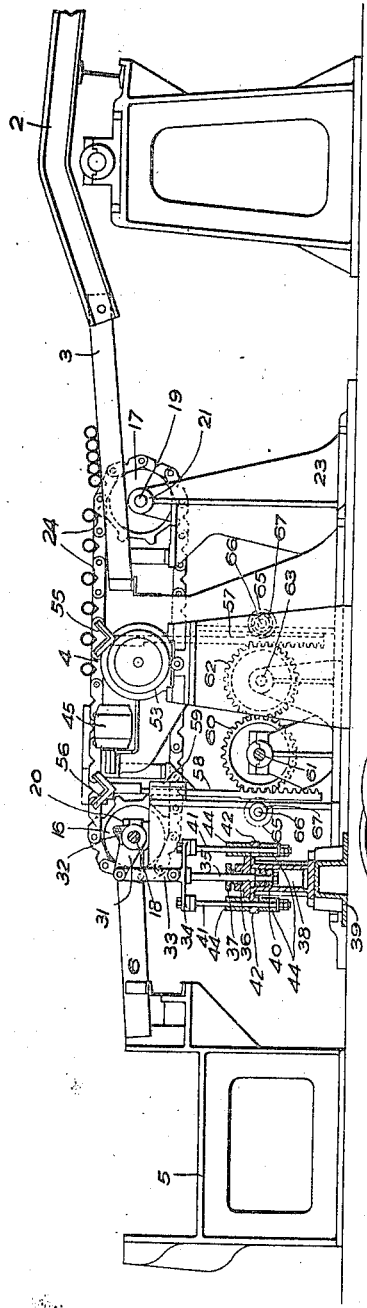

BEST AVAILABLE COPY

UNITED STATES PATENT OFFICE.

DAVID HEGGIE, OF LORAIN, OHIO, ASSIGNOR TO NATIONAL TUBE COMPANY, OF PITTSBURGH, PENNSYLVANIA, A CORPORATION OF NEW JERSEY.

SAWING-MACHINE.

1,155,060.      Specification of Letters Patent.     Patented Sept. 28, 1915.

Application filed January 21, 1915. Serial No. 3,526.

*To all whom it may concern:*

Be it known that I, DAVID HEGGIE, a citizen of the United States, and resident of Lorain, in the county of Lorain and State of Ohio, have invented certain new and useful Improvements in Sawing-Machines, of which the following is a specification.

My invention relates to the construction and arrangement of conveyers used in handling long metal articles such as welded pipes and tubes and rolled metal bars and similar materials and while not limited to such use more particularly relates to the construction and arrangement of apparatus used in handling the smaller sizes of welded pipe in transferring the pipes into position to be cut to length, in supporting the pipes while being cut to length, and in transferring the pipes from the saws or other cutting mechanism after completing the cutting operations.

The ends of welded pipes and similar materials, at the completion of the welding operation, are very irregular in contour, and each end of the pipes must be cropped in cutting the pipes to length. Heretofore in cropping the pipes the amount or length cut from each end has been arbitrarily determined by a workman who positioned the pipes on the conveyer table relative to the cutting mechanism by pulling each pipe lengthwise upon the conveyer preparatory to the cutting operations. By depending upon the judgment of the workman to determine the cutting position of the pipes and the length or amount cut from each end of the pipes in cropping the pipes, the amount cut off the ends of the pipes is unnecessarily large, so that the scrap loss is excessive and adds materially to the cost of manufacture. The length of the successive pipes differs considerably on account of variations in the gage or thickness of the skelp from which the pipes are made and by reason of the variations in the length of the skelp from which the pipes are made the inequalities on the ends of the pipes are irregular in extent. Owing to variations in length of the successive pipes, to cut all of the pipes to the same length would result in some being cut considerably shorter than necessary, causing a waste of good material.

One object of my invention is to provide a conveyer of novel construction having improved means for handling and conveying the pipes in positioning the pipes for the cropping operations by the use of which each separate pipe is cropped or cut to the greatest possible length, so that the scrap loss in making the pipes is greatly reduced and the cost of manufacture is correspondingly lessened.

Another object of my invention is to provide a conveyer having improved means for mechanically handling the welded pipes in transferring the pipe from the sizing rolls or straightening rolls into position to be cropped or cut to length and for moving the pipes into cutting engagement with the saws or other cutting mechanism.

Another object of my invention is to provide a conveyer having novel means for mechanically moving the pipes lengthwise while supported upon the conveyer in positioning the pipes preparatory to being cropped or cut to length.

A further object of my invention is to provide a conveyer having novel means for mechanically operating the conveyer and for actuating the positioning mechanism whereby the pipes are moved lengthwise on the roller table of the conveyer while being conveyed transversely on the conveyer from the receiving end thereof into cutting position opposite the saws or cutting mechanism used in conjunction with the conveyer.

The invention still further consists in the novel construction and arrangement of parts as will be more fully described hereinafter and as specifically pointed out in the appended claims.

Referring now to the drawings forming part of this specification, Figure 1 is a plan showing a conveyer constructed and arranged in accordance with my invention. Fig. 2 is a side elevation of the apparatus shown in Fig. 1. Fig. 3 is a sectional end elevation of the conveyer shown in Fig. 1, with the motor and saw omitted, the section being taken on the line III—III of Fig. 1. Fig. 4 is a similar sectional end elevation of the apparatus of Fig. 1, the section being taken on the line IV—IV of Fig. 1. Fig. 5 is a sectional plan of a portion of the apparatus showing details of the construction of the target or stop against which the pipe ends are moved by the feed rollers. Fig. 6 is a sectional end elevation showing the construction of the feed rollers of the roller table and inserted ribs therefor. Fig. 7 is a sectional plan showing a detail of the ratchet wheel, pawl and swinging ratchet arm. Fig. 8 is a detail side elevation showing the construction of the notched conveyer chain.

In the accompanying drawings the numerals 2 designate a series of skids or supports forming the bed on which the welded pipes are conveyed transversely of their length from the discharge side of the sizing rolls, or when used, from the discharge end of the pipe straightening rolls. The sizing rolls and straightening rolls (not shown) will be located on the discharge side of the draw bench in making buttweld pipe, or the discharge side of the welding rolls used in making lapweld pipe.

The pipes or tubes being cylindrical will readily roll on the skids 2 and endless, power driven sprocket chains having fingers at suitable intervals form a convenient and well-known means for moving and regulating the movement of the pipes from one end to the other of the bed formed by the skids 2.

Positioned at one end of the cooling bed formed by the series of skids 2 is a conveyer constructed and arranged in accordance with my invention. This conveyer is connected to the skids 2 by a series of inclined skids 3, on which the pipes are delivered from the skids 2 to the series of endless roller chains 4 forming part of my improved conveyer, five strands of the chain 4 being used on the apparatus shown. On the discharge end of the conveyer is a series of cradles 5 into which the pipes are delivered by inclined skids 6 from the chains 4, and in which the pipes are collected so as to be removable in bulk or quantities.

Positioned at opposite sides of the conveyer are two power driven hot saws 7 and 8, which are offset one with respect to the other so as to be in staggered relation, this arrangement of the saws enabling each end of each of the pipes being cropped in a separate cutting or cropping operation. The saws 7 and 8, which are cylindrical disks, preferably having teeth on the periphery thereof, are removably secured on mandrels 9 which are rotatably mounted in bearings on the saw housings or standards 10 and 11, and the mandrel driving pulleys are connected by endless belts 12 with the driving pulleys of the electric saw driving motors 13. The motors 13 are adjustably mounted on suitable bases or bed plates 14 and a saw guard 15 is provided on the saws 7 and 8 for reasons of safety.

The endless chains 4 are carried upon sprocket wheels 16 and 17 which are keyed or otherwise secured on the line shaft 18, and on individual sprocket wheel shafts 19, the shaft 18 being rotatably mounted in pairs of bearings 20 and the shafts 19 in pairs of bearings 21, on the tops of the bearing stands 22 and 23. The chains 4 are mounted on the sprocket wheels with the V shaped notches 24 in the opposite links of the chains in alinement, so that the pipes, when supported in the notches in the chains 4, will be spaced at regular distances apart.

The double links of the chains 4 are pivotally connected at their ends by suitable pins 25, anti-friction rollers 26 between the chain links being pivoted on the link pins, and the pins are positioned on the links so the rollers 26 will project slightly below the inner edges and will not extend above the outer edges of the endless chains.

Horizontal bearing plates 27, which extend between the opposite sprocket wheels 16, 17 for the chains 4 support the top strand of these chains, the anti-friction rollers 26 engaging the top surface of the bearing plates which are secured at their ends by posts 28 to shelves 29 forming part of the bearing stands 22 and 23.

Secured on the shaft 18 near one end thereof, so as to rotate with the shaft, is a ratchet wheel 30 and pivoted on each side of this ratchet wheel is a double rocking arm 31 (see Figs. 1, 3, and 7). Pivoted to the rocking arm 31 is a ratchet pawl 32 whose outer swinging end is arranged to engage with the teeth in the ratchet wheel 30 and intermittently turn the shaft 18 in moving the endless chains 4.

The outer or swinging end of the rocking arm 31 is pivotally connected by a link 33 to the upper end of a cross arm 34 which is connected at the middle of its length to the upper end of a vertically movable piston rod 35. The piston rod 35 extends vertically downward through a stuffing box 36 and gland 37 into the double acting fluid pressure cylinder 38 which is secured at its lower end to a base or support 39, the piston rod 35 having a piston 40 on its lower end within the cylinder 38.

The ends of the cross arm 34 have depending vertically adjustable rods 41 thereon which extend through openings in the lugs or ears 42 on the flange on the top end of the cylinder 38. Annular rubber rings 44 are positioned upon the rods 41, on opposite sides of the lugs or ears 42, to form yielding stops which limit the stroke of the vertically reciprocating piston rod 35 in actuating the rocking arm 31 to turn the shaft 18 and move the conveyer chains 4 on the conveyer table.

A series of power driven feed rollers 45 and an idle roller 45ª are positioned between the adjacent endless chains 4, with their axes of rotation extending lengthwise parallel with the length of the chains. These feed rollers have shafts by which they are mounted in pairs of bearings 46, 46, and a bevel gear 47 on one end of each roller shaft meshes with a driving bevel gear 48 on the line shaft 49. The line shaft 49 is rotatably mounted in bearings 50 and one end of the shaft is connected by a spur gear 51 with a spur pinion 52 on the armature shaft of the electric roller driving motor 53.

As in some cases the pipes may be slightly bowed or bent the rollers 45 are provided with inserted ribs 54, (see Fig. 6,) which project beyond the surface of the rollers, so as to engage with and insure a bent pipe being carried lengthwise on the rollers 45 when the rollers are rotated. The cylindrical surfaces of the rollers 45 are arranged so as to be slightly higher than the bottom of the pipe when the pipe is positioned in the V grooves 24 in the upper edges and slightly lower than the upper edges of the links of the conveyer chains 4, in this way enabling the conveyer chain to carry the pipes transversely into and out of position above the rollers 45.

Positioned on each side of the roller table formed by the rollers 45, between adjacent strands of the conveyer chain 4, so as to be lengthwise parallel and in alinement with the axis of rotation of each saw, is a sectional vertically movable pipe supporting trough 55 and 56. The trough 55 which is V shaped in cross section is employed in lifting successive pipes supported thereon into cutting engagement with the saw 7 and the sectional trough 56 is employed in lifting successive pipes supported thereon into cutting engagement with the saw 8.

Each section of the trough 55, and also each section of the trough 56 is secured to one end of a vertically extending rack 57 or 58 and each of these racks is secured, so as to be movable vertically, in a rack bearing 59, the racks being arranged to move in unison. Meshing with the teeth in the racks 58 are spur gears 60 on the line shaft 61 and meshing with the teeth of the racks 57 are spur gears 62 mounted on short shafts 63, 63 which are mounted in bearings 64. The spur gears 62 on the shafts 63 mesh with and are rotated by the spur gears 60. An anti-friction roller 65 which is rotatably mounted on a pin 66 is secured in bearings 67 on the rack bearings 59 to maintain the teeth of the racks in mesh with the teeth of the spur gears 60 and 62.

The line shaft 61 which is rotatably mounted in bearings 68 is provided at an intermediate point in its length with a driving pinion 69 which meshes with the teeth of the horizontally extending reciprocating rack 70. The rack 70 is secured by one end to the outer end of a piston rod 71 and is maintained in operative relation with the pinion 69 by means of the anti-friction roller 72 which is pivotally mounted in bearings 73 on the bearing stand 73ª. The piston rod 71 has a piston 71ª on one end which is mounted in the double acting fluid pressure cylinder 74, the piston rod extending through a stuffing box 75 and gland 75ª on the head 74ª on one end of the cylinder 74.

Immediately beneath each of the hot saws 7 and 8 is a vertically movable pipe support 76 for the ends of the pipes being sawed. The supports 76 are secured to the upper ends of racks 77 and each rack is mounted in a bearing 77ª.

Meshing with the teeth of each rack 77 is a spur gear 78, these gears being mounted on the line shaft 61 and operating to raise and lower the pipe supports 76 in unison with a similar movement of the sectional V shaped troughs 55 and 56.

Located at one side of the saw 8, (see Figs. 2 and 5,) is an adjustable stop or target 79 which is adjustably secured on the horizontal slide 80. The slide 80 is fastened by one end to the upper end of a vertically movable rack 81 and the rack 81, which is mounted in a rack bearing 82 similar to the rack bearings 77ª, has teeth meshing the teeth of a spur gear 83 on the line shaft 61, at one side of the bed plate for the saw 8, so that the slide 80 and stop 79 are lifted and lowered in unison with the support 76 and pipe lifting trough 56 for the hot saw 8.

The stop 79 is secured on the slide 80 so as to be horizontally adjustable to bring the pipe engaging face 84 thereof into the desired position, so the length of the piece cropped or cut off the abutting end of the pipes may be varied from time to time to suit the particular size of pipe being cut to length.

The operation of my improved apparatus will now be described. The pipes are delivered from the discharge end of the cooling bed 2 on the skids 3 to the chains 4. Fluid pressure is admitted to the cylinder 38 so as to oscillate the swinging arm 31 and through the ratchet wheel 30 and pawl 32 rotate the shaft 18 to move the chains 4 across the conveyer table, by a step by step movement. Each successive series of alined links of the chains 4 pick up a pipe from the skids 3 as the links pass the conveyer table end of the skids 3, the V shaped notches 24 in the outer edges of the chain links enabling this lifting movement to be effected. The chains will only engage with and remove a pipe from the skids 3 when the pipe is engaged by an alined series of V shaped notches 24, so the pipes are spaced on the chains the same distance as that between centers of the V shaped notches of adjacent chain links. The pipes will maintain this spaced relation while being transferred into cutting position and from the cutting positions into position to be discharged from the chains to the skids 6, on which they roll into the cradles 5.

After each pipe is transferred to the chains from the skids 3, a workman will move it lengthwise, to bring the end of the pipe nearest the saw 7 into position to cut the correct amount from the ends of the pipe.

As the front or first welded end is more regular and more nearly square than the last welded end of the pipes, the amount necessary to cut off the front end is less than is necessary to cut from the last welded end. This difference is caused by inequalities in the gage or thickness of the skelp and is indicated by a greater degree of inequality on the rear or last welded end of the pipes. For this reason the position of the pipe in cutting the last welded more irregular end, is left to the judgment of the operator and this end of the pipes is cut by the saw 7, with the apparatus arranged as shown. By moving the successive pipes endwise while passing a fixed point, the right amount to be cropped off the pipe is readily determined with sufficient accuracy.

When each successive pipe reaches a position immediately above the vertically movable sectional trough 55 and pipe support 76 opposite the saw 7 the movement of the chains 4 is interrupted. Fluid pressure is then admitted to the stuffing box end of the fluid pressure cylinder 74 and the piston rod 71 is caused to travel toward the front end of the cylinder. Such movement of the piston causes the rack 70 to rotate the line shaft 61 and short shafts 63 and rotation of these shafts causes the racks 57 and 58 and trough sections 55 and 56 on the upper ends thereof and the rack 77 and pipe support 76 on the end of this rack to move vertically upward and lift the pipe which is transferred from the chain to the trough by this upward movement of the trough into cutting engagement with the rapidly rotating saw 7. Fluid pressure is then admitted to the stuffing box end of the cylinder 74 and, through the connecting gearing, the trough 55 and pipe support 76 are lowered in position below the level of the top edges of the chains 4, this movement again depositing the pipe just cut into the series of V shaped notches 24 in the chain, from which it was lifted in the cutting operation. The piston in the vertical fluid pressure cylinder 38 is then actuated to again operate the chains 4 until the pipe, from which one end has been cropped, is in position above the feed rollers 45. The motor 53 is then started in operation to rotate the rollers 45 in a counter-clockwise direction, so as to move the pipe now supported thereon lengthwise from left to right and bring its uncut end into engagement with the stop 79 adjacent to the saw 8. This stop, which has been adjusted by the mill foreman or superintendent, determines the amount cut from the first welded end of the pipes, an amount just sufficient to square up the end without waste. The rollers 45 are then stopped and the chain 4 is again operated in the same manner as has been described to bring the now lengthwise positioned pipe immediately above the sectional pipe lifting trough 56 by which the pipe is lifted into cutting engagement with the saw. This lifting movement of the troughs is effected in the same manner as has been described, the two lifting troughs 55 and 56 being connected to the operating mechanism so as to be lifted in unison. After the trough has lifted the pipe into cutting engagement with the saw 8, and this pipe is again lowered until supported in the V shaped notches of the chains 4, the movement of the chains is again continued and by this forward movement of the chains the now sawed pipe is finally delivered by the chains to the skids 6 from which it rolls into the cradles 5.

As the intermittent movement of the chains 4 progresses the alined series of notches 24 in each link of the chains will remove a pipe from the skids 3 so that when the first pipe is discharged from the ends of the chains to the skids 6 a pipe will be supported in each series of notches on the chain. For this reason when a pipe reaches the position in which it is lifted into cutting engagement with the saw 8 another pipe will be in position above the trough 55 by which the pipes are lifted into cutting engagement with the saw 7 which first operates on the pipe and after the notches 24 in the chains 4 have been filled with pipes one end will be cropped on each of two pipes with each lifting movement of the trough 55 and trough 56.

In transferring the pipes from one side to the other of the conveyer table, the same series of operations will be carried out, each pipe being positioned by a workman to determine the amount cut from one end which is then cut from the pipe by the saw 7. The pipe is again transferred to the notched chains, is then moved transversely of its length until above the feed rollers 45 by which it is moved endwise into engagement with the adjustable stop 79 for the saw 8.

The lengthwise positioned pipe is then moved by the chains 4 into position to be lifted by the trough 56 into cutting engagement with the saw 8 and after being again transferred to the chains is conveyed and discharged by the chains to the skids 6 and is delivered into the cradle 5.

When a sufficient quantity of cut pipes are collected in the cradles 5, a sling is placed around them and they are removed by means of an electric traveling crane, to the trolley of which the sling is secured. The pipes are then transferred in this manner into position to be tested or otherwise operated upon.

The advantages of my invention will be appreciated by those skilled in the art. By means of my improved apparatus the length cut from one end of the successive pipes is not left to the judgment of a workman, but is made uniform so that the loss caused by cutting an excessive amount from the ends of the pipe is prevented and the cost of manufacture of the pipes is materially lessened.

Modifications in the construction and arrangement of the parts can be made without departing from my invention as defined in the appended claims.

I claim:

1. In a conveyer, the combination with a series of lengthwise parallel conveyer chains, said series of chains having a saw at each side thereof and means for intermittently actuating said chains in transferring materials supported thereon from one to the opposite end thereof, of lifting troughs arranged to lift materials from said chains into cutting engagement with said saws, means for actuating said lifting troughs, a roller table between the ends of said series of chains, arranged to move materials supported on said chains lengthwise in positioning said materials on the chains and means for actuating said roller table.

2. In a conveyer, the combination with a series of lengthwise parallel conveyer chains, said series of chains having a saw at each side thereof and means for intermittently actuating said chains in transferring materials supported thereon from one to the opposite end thereof, of lifting troughs arranged to lift materials from the chains into cutting engagement with said saws, means for actuating said lifting troughs, a roller table between the ends of said series of chains arranged to move materials supported on said chains lengthwise, a stop to engage the end of the lengthwise moving materials in positioning said materials on the chains, and means for actuating said roller table.

3. In a conveyer, the combination with a series of lengthwise parallel conveyer chains, said chains having saws adjacent to two diagonally opposite corners of the series of chains, and means for intermittently actuating said chains in transferring materials supported thereon from one to the other end thereof, of a sectional lifting trough extending lengthwise opposite each of said saws, means for actuating said troughs to lift materials from the chains into cutting engagement with the saws and a roller table extending lengthwise parallel with said sectional lifting troughs, arranged to move materials supported on said chains lengthwise to position the materials thereon.

4. In a conveyer, the combination with a series of lengthwise parallel conveyer chains having saws adjacent to two diagonally opposite corners of said series of chains, and means for intermittently actuating the chains in transferring materials supported thereon from one to the other end thereof, of sectional lifting troughs extending lengthwise opposite said saws, means for actuating said troughs to lift materials from the chains into cutting engagement with said saws and a roller table extending lengthwise parallel with said sectional lifting troughs, said table being arranged to move materials supported on said chains lengthwise to position the materials thereon and a stop to engage the end of the lengthwise moving materials.

5. In a conveyer, the combination with a series of lengthwise parallel notched conveyer chains having saws adjacent to two diagonally opposite corners of said series of chains, and means for intermittently actuating said chains in transferring materials supported thereon from one to the other end thereof, of sectional lifting troughs extending lengthwise opposite said saws, means for actuating said troughs to lift materials from the notched chains into cutting engagement with the saws and a roller table extending between and lengthwise parallel with said sectional lifting troughs, said troughs being arranged to move materials supported on said chains lengthwise to position the materials thereon and an adjustable stop to engage the end of the materials.

6. In a conveyer, the combination with a series of lengthwise parallel notched conveyer chains having saws adjacent to two diagonally opposite corners of said series of chains, and means for intermittently actuating the chains in transferring materials supported thereon from one to the other end thereof, of a sectional lifting trough extending lengthwise opposite said saws, means for actuating the troughs to lift materials from the notched chains into cutting engagement with said saws, a roller table between and extending lengthwise parallel with said sectional lifting troughs to position the materials thereon and a stop to engage the end of the lengthwise moving materials.

7. In a conveyer, the combination with a series of lengthwise parallel notched conveyer chains having a saw at each side thereof and means for intermittently actuating said chains in transferring materials supported thereon from one to the opposite end thereof, of lifting troughs arranged to lift materials from the notches in said chains into cutting engagement with said saws, means for actuating said lifting troughs, said means including lifting racks, bearings for the said racks, a shaft having spur gears meshing with the said racks and means for rotating said shaft.

8. In a conveyer, the combination with a series of lengthwise parallel notched conveyer chains having a saw at each side thereof and means for intermittently actuating said chains in transferring materials supported thereon from one to the opposite end thereof, of lifting troughs arranged to lift materials from the notches in said chains into cutting engagement with said saws, means for actuating said lifting troughs, said means including lifting racks and rack bearings, a shaft having spur gears meshing with the said racks, a driving pinion on said shaft, a reciprocating rack meshing with said driving pinion and a fluid pressure cylinder for reciprocating said rack.

9. In a conveyer, the combination with a series of lengthwise parallel notched conveyer chains having a saw at each side thereof and means for intermittently actuating said chains in transferring materials supported thereon from one to the opposite end thereof, of lifting troughs arranged to lift materials from the notches in said chains into cutting engagement with said saws, means for actuating said lifting troughs, said means including lifting racks and rack bearings, a shaft having spur gears meshing with the said racks, a driving pinion on said shaft, a reciprocating rack meshing with said driving pinion and a fluid pressure cylinder for reciprocating said rack, said cylinder having yielding stops for limiting the stroke of said rack.

In testimony whereof, I have hereunto set my hand.

DAVID HEGGIE.

Witnesses:
ARTHUR R. GRABER,
JAS. H. FLENNIKEN.